United States Patent
Evans et al.

(10) Patent No.: US 8,005,644 B1
(45) Date of Patent: Aug. 23, 2011

(54) APPLICATION TRANSACTION ANALYSIS

(75) Inventors: R. Charles Evans, Overland Park, KS (US); Brian E. Hayward, Lawrence, KS (US); Shaun M. Johnson, Kansas City, MO (US); Justin A. Martin, Olathe, KS (US); Brian J. Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 177 days.

(21) Appl. No.: 12/390,406

(22) Filed: Feb. 20, 2009

(51) Int. Cl.
*G06F 11/30* (2006.01)

(52) U.S. Cl. ........................ 702/183; 702/122; 702/189

(58) Field of Classification Search .................. 709/203, 709/223; 705/2, 7; 702/122, 183, 189; 370/236.2, 370/237–238, 241.1, 468
See application file for complete search history.

(56) References Cited

U.S. PATENT DOCUMENTS

| | | | |
|---|---|---|---|
| 7,526,685 B2 * | 4/2009 | Noy et al. ................. | 714/47.2 |
| 7,676,706 B2 * | 3/2010 | Addleman et al. .......... | 714/57 |
| 2007/0156479 A1 * | 7/2007 | Long ............................ | 705/7 |
| 2008/0221918 A1 * | 9/2008 | Petersen et al. ............. | 705/2 |

* cited by examiner

*Primary Examiner* — Michael P Nghiem
*Assistant Examiner* — Elias Desta

(57) ABSTRACT

A system provides network application transaction analysis. An analysis tool, when executed by a processor, measures an application transaction metric and calculates a historical system average and a historical application average associated with the application transaction metric based on server performance logs. The tool determines whether the application transaction metric differs from the historical system average by more than a first threshold amount during consecutive measurements. The tool determines whether the application transaction metric differs from the historical application average by more than a second threshold amount during consecutive measurements if the application transaction metric does not differ from the historical system average by more than the first threshold amount during consecutive measurements. The tool outputs an alarm to a user interface to enable a generation of an investigation if the application transaction metric differs from the historical application average by more than the second threshold amount during consecutive measurements.

20 Claims, 3 Drawing Sheets

APPLICATION TRANSACTION ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some enterprises depend upon computer systems, such as computer programs or applications executing on different servers, to conduct their business. These applications may be developed using different programming languages and may have been developed at different times. These servers may be from different manufacturers and may employ different operating systems. For example, a telecommunications service provider may depend upon computer applications to provide various business functions, such as entering a customer order for telecommunications service, activating and providing telecommunications services to the customer, generating a customer bill for telecommunications services, and recording customer payments.

SUMMARY

In some embodiments, a system is provided for network application transaction analysis. The system includes a processor, a user interface, and an analysis tool. The analysis tool, when executed by the processor, measures an application transaction metric and calculates both a historical system average and a historical application average associated with the application transaction metric based on server performance logs. The analysis tool determines whether the application transaction metric differs from the historical system average by more than a first threshold amount during consecutive measurements. If the application transaction metric does not differ from the historical system average by more than the first threshold amount during the consecutive measurements, the analysis tool determines whether the application transaction metric differs from the historical application average by more than a second threshold amount during the consecutive measurements. If the application transaction metric differs from the historical application average by more than the second threshold amount during the consecutive measurements, the analysis tool outputs an alarm to a user interface to enable a generation of an investigation.

In some embodiments, a method is provided for network application transaction analysis. An application transaction metric is measured. Both a historical system average associated and a historical application average associated with the application transaction metric are calculated based on server performance logs. A determination is made whether the application transaction metric differs from the historical system average by more than a first threshold amount during a plurality of consecutive measurements. If the application transaction metric differs from the historical system average by more than the first threshold amount during the plurality of consecutive measurements, a determination is made whether the application transaction metric differs from the historical application average by more than a second threshold amount during the plurality of consecutive measurements. If the application transaction metric differs from the historical application average by more than the second threshold amount during the plurality of consecutive measurements, an alarm is output to a user interface to enable a generation of an investigation. If the application transaction metric does not differ from the historical application average by more than the second threshold amount for the plurality of consecutive measurements, a notification is output to the user interface to provide an update.

In some embodiments, a system is provided for network application transaction analysis. The system includes a processor, a user interface, and an analysis tool. The analysis tool, when executed by the processor, measures a transaction success metric for application transactions and a volume of the application transactions. The transaction success metric is defined as a transaction success amount divided by an amount of transaction attempts. The transaction success amount is defined as an amount of successful transactions that fail a service level objective subtracted from an amount of successful transactions. The analysis tool calculates both a historical system average and a historical application average associated with the transaction success metric based on server performance logs. The analysis tool also determines whether the transaction success metric differs from the historical system average by more than a first threshold amount based on the volume during a plurality of consecutive measurements. Furthermore, if the transaction success metric differs from the historical system average by more than the first threshold amount based on the volume during the plurality of consecutive measurements, the analysis tool determines whether the transaction success metric differs from the historical application average by more than a second threshold amount based on the volume during the plurality of consecutive measurements. Moreover, if the transaction success metric differs from the historical application average by more than the second threshold amount based on the volume during the plurality of consecutive measurements, the analysis tool outputs an alarm to the user interface to enable an investigation. If the transaction success metric does not differ from the historical application average by not more than the second threshold amount based on the volume for the plurality of consecutive measurements, the analysis tool outputs a notification to the user interface to provide an update.

These and other features will be more clearly understood from the following detailed description taken in conjunction with the accompanying drawings claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION OF THE PREFERRED EMBODIMENTS

Figure 1:
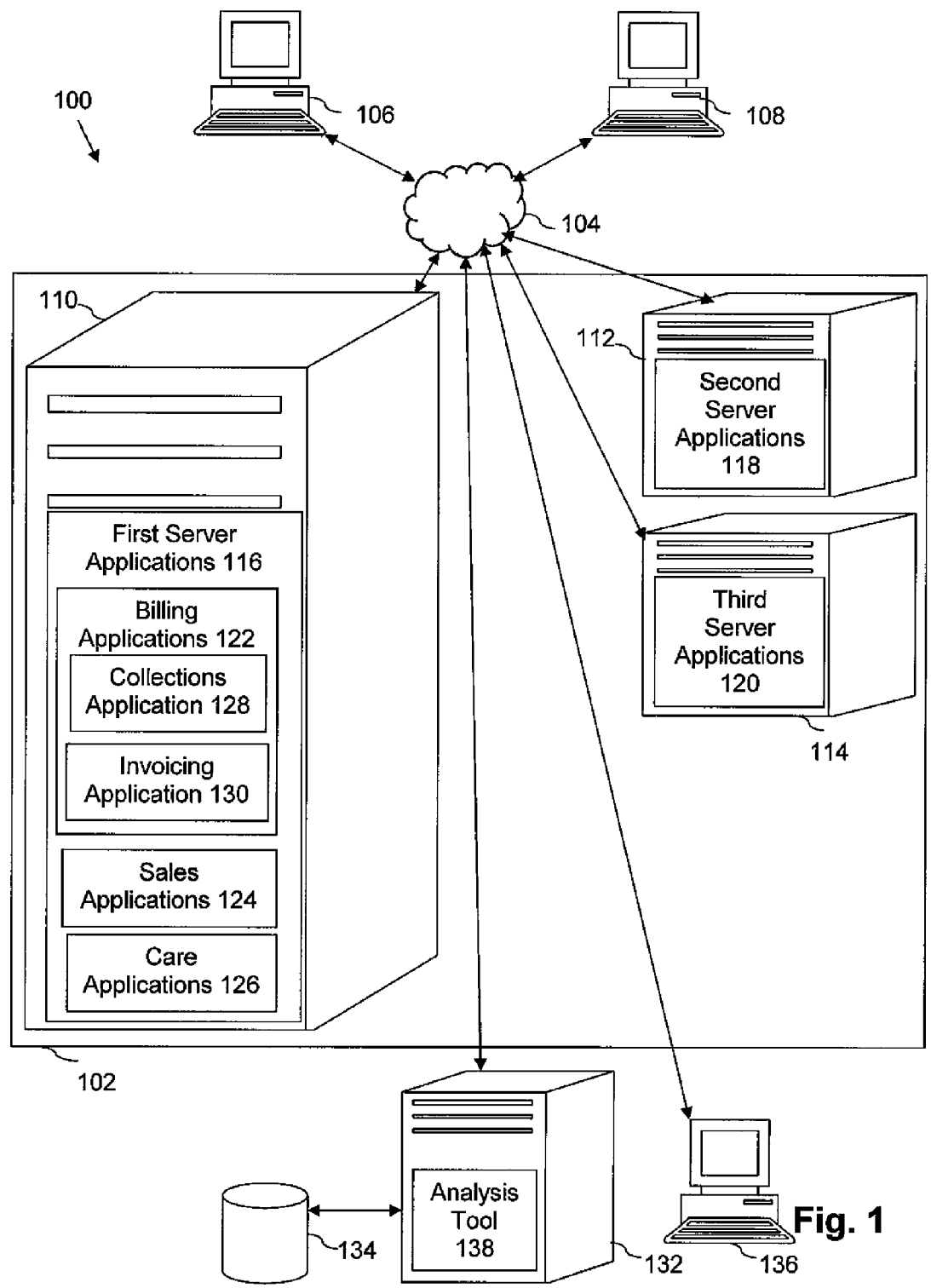
FIG. 1 shows a system for application transaction analysis according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Some enterprises monitor computer systems by watching the utilization of central processing units (CPU) executing processes on the computer system's servers. However, the monitoring of CPU utilization may seem to indicate that a system's servers are properly functioning and providing services to customers even when the computer system in unable to communicate with the customers. The pending disclosure provides systems and methods for network application transaction analysis. Rather than monitoring CPU utilization, an analysis tool monitors the functional results of customer service by measuring an application transaction metric, such as an average response time, the volume of application transactions, and/or an application transaction error rate. Based on server performance logs, which record information about application transactions for each server in a computer system, the analysis tool calculates a historical system average and a historical application average associated with the application transaction metric. For example, the analysis tool calculates that an invoicing application averaged 500 milliseconds per transaction during a 5 minute measurement period and then averaged 505 milliseconds per transaction during the next measurement period, the invoicing application historically averaged 300 milliseconds per transaction, and the server that executes the invoicing application historically averaged 400 milliseconds per transaction.

The analysis tool determines whether the application transaction metric differs from the historical system average by more than a system threshold amount during consecutive measurements. By basing comparisons on consecutive measurements, such as measurements made every five minutes, the analysis tool evaluates ongoing conditions rather than temporary conditions. For example, the analysis tool determines whether the invoicing application's transaction averages of 500 and 505 milliseconds differ from the server's historical transaction average of 400 milliseconds by more than the standard deviation of 120 milliseconds for the server's historical transaction average. In this example, the invoicing application's transactions are currently not taking significantly longer than the server's transactions have historically taken.

Even if an application's transactions are not taking significantly longer than its server's transactions have historically taken, the application may still have a problem if the application's transactions are taking significantly more time than the applications' transactions have historically taken. If the application transaction metric does not differ from the historical system average by more than the system threshold amount during the consecutive measurements, the analysis tool determines whether the application transaction metric differs from the historical application average by more than an application threshold amount during the consecutive measurements. For example, the analysis tool determines whether the invoicing application's transaction averages of 500 and 505 milliseconds differs from the invoicing application's historical transaction average of 300 milliseconds by more than the standard deviation of 90 milliseconds for the invoicing application's historical transaction average. In this example, the invoicing application's transactions are currently taking significantly longer than the invoicing application's transactions have historically taken.

Therefore, even though the invoicing application's transactions were not taking significantly longer than the server's transactions have historically taken, the analysis tool was able to detect that the invoicing application's transactions were actually taking significantly longer than the invoicing application's transactions have historically taken. This situation may indicate the early onset of a problem that would not have been detected by only comparing the invoicing application's transaction averages to the server's historical transaction averages. If the application transaction metric differs from the historical application average by more than the application threshold amount during the consecutive measurements, the analysis tool outputs an alarm to a user interface to enable a generation of an investigation. The analysis tool may detect an application problem in only 10 or 15 minutes and enable system technicians to begin addressing this problem shortly thereafter, in contrast to the system technicians having to wait for four hours before the problem worsened to the point that the invoicing application's transaction average differed significantly from the server's historical transaction average. The analysis tool may anticipate potential complaints from customers by enabling the quick identification of performance issues and accurately identifying a specific application as the source of the potential problem.

If the application transaction metric differs from the historical system average by more than the system threshold amount during consecutive measurements, the analysis tool determines whether the application transaction metric differs from the historical application average by more than the application threshold amount during the consecutive measurements. For example, a collections application's transaction averages are 610 and 615 milliseconds, which differ from the server's historical transaction average of 400 milliseconds by more than the standard deviation of 120 milliseconds for the server's historical transaction average. In this situation, the analysis tool determines whether the collections application's transaction averages of 610 and 615 milliseconds differ from the collections application's historical average of 525 milliseconds by more than the standard deviation of 150 milliseconds for the collections application's historical transaction average. The collections application's transactions may take more time historically because the collections application is responsible for loading many web pages that contain errors. As such, the collections application's current transaction averages are not indicative of the onset of a problem, but indicative of the need for an eventual solution for a long term condition.

If the application transaction metric does not differ from the historical application average by more than the application threshold amount for the consecutive measurements, the analysis tool outputs a notification to the user interface to provide an update. For example, even though the collections application's transaction averages are not significantly more than the collections application's historical transaction averages, the collections application's transaction averages are still significantly more than the server's historical transaction average. In this circumstance, system technicians may not need to address this notification as an alarm, but they may want to address this notification through the eventual planning of a long-term solution. When an application's transaction metrics are within their historical ranges, even if these ranges are higher than the average transaction ranges for their server, the analysis tool sends a notification instead of an alarm, thereby reducing false alarms. If an application's transaction metrics indicate that an application is executing in a manner to which customers are already accustomed, an enterprise may save time and expenses by assigning higher priority to addressing other issues.

The application transaction metric may also be a transaction success metric, which may be referred to as a "good throughput" metric, that is defined as a transaction success amount divided by an amount of transaction attempts, with the transaction success amount defined as an amount of successful transactions that fail a service level objective subtracted from an amount of successful transactions. For example, the invoicing application processes 1000 transaction attempts during a period of time, executed 985 successful transactions in response, and 5 of the 985 successful transactions failed a service level objective for a transaction response time of less than 1 second. For this example, the 5 successful transactions that failed the service level objective are subtracted from the 985 successful transactions to produce a transaction success amount of 980. The transaction success amount of 980 is divided by the 1000 transaction attempts to produce the transaction success metric of 98%. The transaction success metric of 98% for the invoicing application may be compared to the historical average transaction success metrics of 90% for the system and 95% for the invoicing application and their corresponding thresholds, which may be standard deviations, to analyze the invoicing application. Using the transaction success metric to analyze application transactions enables enterprises to evaluate the relative processing health of each application.

FIG. 1 shows a system 100 for application transaction analysis according to some embodiments of the present disclosure. The system 100 includes a computer system 102, a communication network 104, and client computers 106-108. The computer system 102 communicates with customers via the client computers 106-108 and the communication network 104.

The computer system 102 includes a first server 110, a second server 112, and a third server 114. The first server 110 executes first server applications 116, the second server 112 executes second server applications 118, and the third server 114 executes third server application 120. The first server applications 116 include billing applications 122, sales applications 124, and care applications 126. The billing applications 122 include a collections application 128 and an invoicing application 130. The servers 110-114 execute the server applications 116-120 to respond to requests from the client computers 106-108 via the communication network 104. The applications 116-120 may be the same on each of the servers 110-114, or some of the applications 116-120 may be specific to some of the servers 110-114. A load balancer and a router, which are not pictured in FIG. 1, may route the requests from the client computers 106-108 to the servers 110-114 based on specific applications executed on the servers 110-114 and/or the workload on each of the servers 110-114.

The system 100 also includes an analysis server 132, a data store 134, and a user interface 136. The analysis server 132 and the user interface 136 communicate with each other and with the servers 110-114 via the communication network 104. The analysis server 132 executes an analysis tool 138 to analyze transactions for the server applications 116-120.

Each of the servers 110-114 routinely records information about their application transactions, and may store this information in different formats. The analysis tool 138 retrieves this information from the servers 110-114 and stores this information in a common format in the data store 134. Based on this information stored in the data store 134, the analysis tool 138 calculates a historical system average, a historical application average, and a currently measured application transaction metric. For example, the analysis tool 138 calculates that the invoicing application 130 averaged 500 milliseconds per transaction during a current measurement period and then averaged 505 milliseconds per transaction during the next measurement period, the invoicing application 130 historically averaged 300 milliseconds per transaction, and the first server 110 that executes the invoicing application 130 historically averaged 400 milliseconds per transaction.

The analysis tool 138 may base calculations on the information from the servers 110-114 that is stored in the data store 134, or a sample of the information in the data store 134. For example, the average transaction time for the invoicing application 130 during a five minute measurement period may be based on all five minutes of information, based on a predefined number of consecutive samples selected from the five minute measurement period, based on a predefined number of samples randomly selected from the five minute measurement period, or based on some other selection of samples from the five minute measurement period. In another example, the historical transaction time for the invoicing application 130 may be based on the previous four Tuesday mornings from 8:00 to 8:05 AM if the average transaction time for the invoicing application 130 is based on a measurement period from 8:00 to 8:05 AM this Tuesday.

The analysis tool 138 may begin to more closely analyze an application transaction metric only after the application transaction metric is calculated as being increased for consecutive measurements or decreased for consecutive measurements. For example, the invoicing application 130 averages 100 milliseconds per transaction during a current measurement period and then averages 95 milliseconds per transaction during the next measurement period, and the invoicing application 130 historically averaged 300 milliseconds per transaction. In this example, the significantly lower average transaction time currently measured may indicate that the invoicing application 130 is no longer processing the requests that normally consume more processing time. The analysis tool 138 may evaluate an application transaction metric over two or three consecutive measurement periods to avoid attributing significance for a temporary change in the transaction metric that occurred during only one measurement period.

The application transaction metric and the historical application average may be associated with an individual application or a category of applications. For example, analysis tool 138 may measure the application transaction metric for the collections application 130 individually, or the category of billings applications 122, which includes both the collections application 128 and the invoicing applications 130. In this manner, the analysis tool 138 may measure application transaction metrics for any group of applications, from the full range of a single application, such as the collections application 128, to all of the applications for a specific server, such as the first server applications 116. Measuring applications by groups of various sizes enables the analysis tool 138 to make corresponding comparisons that analyze the application transactions for any of the groups of applications.

The analysis tool 138 may calculate the historical averages based on a time of day and/or a day of week. For example, customers may tend to contact call centers late on Monday morning for assistance with their accounts and customers may tend to check their billing statements on Fridays. Other factors that may affect the volume of transaction for any application may include when school is in session, the weather conditions, and when it is light or dark outside. Each of the applications 124-128 may be associated with different volumes of application transactions because the applications 124-128 may respond to different types of customer requests. When the volume of application transactions increases, other application transaction metrics may be impacted, such as average application transaction time. For example, if the volume of application transactions increases 60% from 8:00 AM to noon on a weekday, the average application transaction time may increase 20% as the servers 110-114 process greater loads of application transactions and approach the limits of their processing capacity. Therefore, the analysis tool 138 may calculate different historical system averages and/or different historical application averages for Monday mornings at 8:00 AM, Friday evenings at 8:00 PM, the first Tuesday in September, and the Friday after Thanksgiving. The analysis tool 138 may even calculate different averages for each hour of each day of the week.

The historical system average associated with the volume of the application transactions may be based on a system capacity, for example the historical system average may be presented as a fraction of or as a percentage of system capacity. Basing the historical system average on a system capacity can adjust for context changes related to the volume of the application transactions. For example, the analysis tool 138 may measure the volume of the collections application 128 as 10,000 transactions within a time period, or as 10% of the capacity for the first server 110 to process within the time period. If hardware and software changes result in the capacity of the first server 110 increasing by 25%, the 10,000 transactions within a time period now represents 8% of the capacity for the first server 110 to process within the time period. In this situation, the 8% of system capacity measured by the analysis tool 138 may better indicate when the system 100 is approaching the limits of its processing capacity rather than the 10,000 transactions would indicate.

The analysis tool 138 may use an application transaction metric that includes both an application transaction response time and the volume of applications transactions to analyze application transactions. For example, the application transaction response time for the collections application 128 increases by 20% during consecutive measurements, and the volume of application transactions increases by 50% during the consecutive measurement. The analysis tool 138 may compare this measured response time to response times associated with similar volumes of application transactions and determine that an increase in response time of 25% is expected under these conditions, such that the 20% increase in response time does not indicate a potential problem. In another example, when the volume of transactions is normal for 8:00 AM on Monday, but the application transaction response time is 30% higher than expected for 8:00 AM on Monday, these application transaction metrics may indicate a potential problem.

The analysis tool 138 may calculate historical averages on a daily or a weekly schedule, and the historical averages may be based on the previous four weeks or the previous thirteen months. For example, on Sunday night the analysis tool 138 may calculate the historical averages to be used for comparison at 8:00 AM on Monday based at the application transaction metrics for the four previous Monday mornings at 8:00 AM, and on Monday night the analysis tool 138 may make calculations used for comparison on Tuesday morning based on the four previous Tuesday mornings. Alternatively, the analysis tool 138 may calculate all of the historical averages that will be used for the next week at any point during a week.

The analysis tool 138 may calculate averages relative to a baseline, for example where the average is presented as a fraction of or as a percentage of the baseline. The present disclosure contemplates a variety of baselines, and the employed baseline may be selectable or configurable by the client computers 106, 108. The baseline may be a system capacity. The baseline may be an average number of transactions during a defined time interval on a defined day. Using a baseline to calculate the historical system average can enable adjustments for context changes related to the volume of the application transactions. Rather than basing transaction averages only on historical raw values that may no longer represent current transaction averages, the analysis tool 138 may adjust for changes in ongoing conditions that impact the volume of transactions. For example, historically the volume of application transactions at 8:00 AM on Wednesdays may be 1% greater than the volume of application transactions at 8:00 AM on Tuesdays and 14% greater than the volume of application transactions at 8:00 AM on Mondays. Continuing this example, a new product release results in increasing the volume of transactions for the sales applications 124 by 90% during the Wednesday, the Thursday, and the Friday of the second week in a month. In response, the analysis tool 138 uses the baseline established by the new product release during the Wednesday of the second week of the month to calculate the historical averages for the Monday and the Tuesday of the third week of the month instead of calculating the historical averages based on the previous four Mondays or the previous four Tuesdays.

The analysis tool 138 may calculate the historical averages based on a filter that excludes outlier data associated with an identified event. For example, the analysis tool 138 may disregard the application transaction information for the Friday after Thanksgiving when calculating the historical averages for the Fridays in December, thereby ensuring that comparisons are based on similar conditions for customers. A user of the analysis tool 138 may also direct the filter to disregard application transaction information associated with unscheduled events, such as a loss of power for customers during a hurricane.

The analysis tool 138 determines whether the application transaction metric differs from the historical system average by more than a system threshold amount during consecutive measurements. By basing comparisons on consecutive measurements, such as every five minutes, the analysis tool evaluates ongoing conditions rather than temporary conditions. For example, the analysis tool 138 determines whether transaction averages of 500 and 505 milliseconds for the invoicing application 130 differ from the historical transaction average of 400 milliseconds for the first server 110 by more than the standard deviation of 120 milliseconds for the historical transaction average for the first server 110. In this example, the transactions for the invoicing application 130 are currently not taking significantly longer than the transactions for the first server 110 have historically taken. Although a standard deviation is used as an example of a threshold, the analysis tool 138 may use various percentages of standard deviations, such as 50% of a standard deviation or 200% of a standard deviation, or other measures that may be known as thresholds to one of skill in the art. The analysis tool 138 may apply a different threshold and/or a different type of threshold to comparisons for each average.

Even if an application's transactions are not taking significantly longer than its server's transactions have historically taken, the application may still have a problem if the application's transactions are taking significantly more time than the applications' transactions have historically taken. Therefore, if the application transaction metric does not differ from the historical system average by more than the system threshold amount during the consecutive measurements, the analysis tool 138 determines whether the application transaction metric differs from the historical application average by more than the application threshold amount during the consecutive measurements. For example, the analysis tool 138 determines whether the transaction averages of 500 and 505 milliseconds for the invoicing application 130 differ from the historical transaction average of 300 milliseconds for the invoicing application 130 by more than the standard deviation of 90 milliseconds for the historical transaction average for the invoicing application 130. In this example, the transactions for the invoicing application 130 are currently taking significantly longer than the transactions for the invoicing application 130 have historically taken.

Therefore, even though the transactions for the invoicing application 130 were not taking significantly longer than the transactions for the first server 110 have historically taken, the analysis tool 138 was able to detect that the transactions for the invoicing application 130 were actually taking significantly longer than the transactions for the invoicing application 130 have historically taken. This situation may indicate the early onset of a problem that would not have been detected by only comparing the transaction averages for the invoicing application 130 to the historical transaction averages for the first server 110.

In an embodiment, if the application transaction metric differs from the historical application average by more than the application threshold amount during the consecutive measurements, the analysis tool 138 outputs an alarm to the user interface 136 to enable a generation of an investigation. The alarm may indicate how far away the application transaction metric is from the application threshold for the historical application average by the user interface 136 displaying a color associated with how far away the application transaction metric is from the application threshold. For example, if the transaction averages for the invoicing application 130 are 105% of the standard deviation above the historical transaction average for the invoicing application 130, the user interface 136 may depict the invoicing application 130 in light blue. In contrast, if the transaction averages for the invoicing application 130 are 400% of the standard deviation above the historical transaction average for the invoicing application 130, the user interface 136 may depict the invoicing application 130 in dark red. Displaying applications using color enables system technicians to not only quickly identify problems, but to prioritize the addressing of problems based on their relative statistical deviations.

The analysis tool 138 may detect an application problem in only 10 or 15 minutes and enable system technicians to begin addressing this problem shortly thereafter, in contrast to the system technicians having to wait for four hours before the problem worsened to the point that the application's transaction average differed significantly from the system's historical transaction average. The analysis tool 138 may anticipate potential complaints from customers by enabling the quick identification of performance issues and accurately identifying a specific application or group of applications that may be the source of the potential problem. The application transaction metrics may indicate that a potential problem exists, such as the failure of the communication link to the first server 110, by detecting a drop in the volume of application transactions for the first server 110, and/or an increase in both the volume of application transactions and the application transaction response time for the servers 112-114 due to the redistribution of requests by the load balancer. In contrast, a tool that simply monitors CPU utilization may not detect some failures. For example, a tool that simply monitors CPU utilization may not detect any indication of failure in a low CPU utilization rate, but in some circumstances a low CPU utilization rate may be correlated with a crashed application, a deadlocked application, or some other anomalous application state.

If the application transaction metric differs from the historical system average by more than the system threshold amount during consecutive measurements, the analysis tool 138 determines whether the application transaction metric differs from the historical application average by more than the application threshold amount during the consecutive measurements. For example, transaction averages for the collections application 128 are 610 and 615 milliseconds, which differ from the historical transaction average of 400 milliseconds for the first server 110 by more than the standard deviation of 120 milliseconds for the historical transaction average for the first server 110. In this situation, the analysis tool 138 determines whether the transaction averages of 610 and 615 milliseconds for the collections application 128 differ from the historical average of 525 milliseconds for the collections application 128 by more than the standard deviation of 150 milliseconds for the historical transaction average for the collections application 128. The transactions for the collections application 128 make take more time historically because the collections application 128 is responsible for loading many web pages that contain errors. As such, the current transaction averages for the collections application 128 may not be indicative of the onset of a problem, but indicative of the need for an eventual solution for a long term condition. Such a solution may include revising web pages, recoding applications, and/or adding additional servers.

If the application transaction metric does not differ from the historical application average by more than the application threshold amount for the consecutive measurements, the analysis tool 138 outputs a notification to the user interface 136 to provide an update. For example, even though the transaction averages for the collections application 128 are not significantly more than the historical transaction averages for the collections application 128, the transaction averages for the collections application 128 are still significantly more than the historical transaction average for the first server 110. Similar to the user interface 136 using color to depict alarms for applications, the user interface 136 may also use colors to depict notifications for applications, where each color indicates how far away the application transaction metric is from the system threshold for the historical system average. The notification may include a suggestion for a long term solution to address the situation. In this circumstance, system technicians may not need to address this notification as an alarm, but they may want to address this notification through the eventual planning of a long-term solution. When an application's transaction metrics are within their historical ranges, even if these ranges are higher than the average transaction ranges for their server, the analysis tool 138 sends a notification instead of an alarm, thereby reducing false alarms. If an application's transaction metrics indicate that an application is executing in a manner to which customers are already accustomed, the enterprise may save time and expenses by assigning higher priority to addressing other issues.

The application transaction metric may also be a transaction success metric that is defined as a transaction success amount divided by an amount of transaction attempts, with the transaction success amount defined as an amount of successful transactions that fail a service level objective subtracted from an amount of successful transactions. For example, the invoicing application 130 processes 1000 transaction attempts during a period of time, executed 985 successful transactions in response, and 5 of the 985 successful transactions failed a service level objective for a transaction response time of less than 1 second. The amount of successful transactions may be based on the amount of transaction attempts that are not associated with a timeout or a failure to find. A service level objective, such as a transaction response time of less than 1 second, may be a goal related to a criteria specified in a contractual service level agreement, such as a transaction response time of less than 1.5 seconds. The analysis tool 138 may generate an investigation of the situation when application transactions are failing service level objectives to take action before a specified amount of the application transactions fail a service level agreement, which may result in the enterprise paying penalties. Continuing the example, the 5 successful transactions that failed the service level objective are subtracted from the 985 successful transactions to produce a transaction success amount of 980. The transaction success amount of 980 is divided by the 1000 transaction attempts to produce a transaction success metric of 98%. The transaction success metric of 98% for the invoicing application 130 may be compared to the historical average transaction success metrics of 90% for the system and 95% for the invoicing application and their corresponding thresholds, which may be standard deviations, to analyze the invoicing application 130.

The analysis tool 138 may use the volume of application transactions in combination with the transaction success metric to analyze application transactions. For example, if the transaction success metric drops from 98% to 90% for consecutive measurements while the volume of application transactions increases to a particular level, the analysis tool 138 may determine that a transaction success metric of 89% has been calculated when the volume of application transaction have historically reached the particular level. In this situation, the analysis tool 138 applies the historical averages and the threshold associated with the historical transaction success metric of 89% and determines that no potential problem is indicated.

The analysis tool 138 may calculate a transaction error rate as part of the application transaction metric. The transaction error rate may include a number of data errors, faults, and/or timeouts. A data error may be based on a data entry problem, such as when a request submits too many digits in an entry field. A fault may occur when code in an application fails to execute properly. A timeout may occur when a requested web page is not found or not loaded within a specified period of time. The analysis tool 138 may compare the overall transaction error rate, the data errors, the faults, and/or the timeouts to historical system averages and historical application averages associated with the corresponding type of transaction errors to analyze application transactions. Additionally, the analysis tool 138 may use the volume of application transactions in combination with the transaction error rate to analyze application transactions. For example, if the number of timeouts increases 20% during consecutive measurements while the volume of application transactions increases by 50%, the analysis tool 138 compares the measured number of timeouts to an expected number of timeouts based on historical calculations for similar volumes of application transactions.

Figure 2:
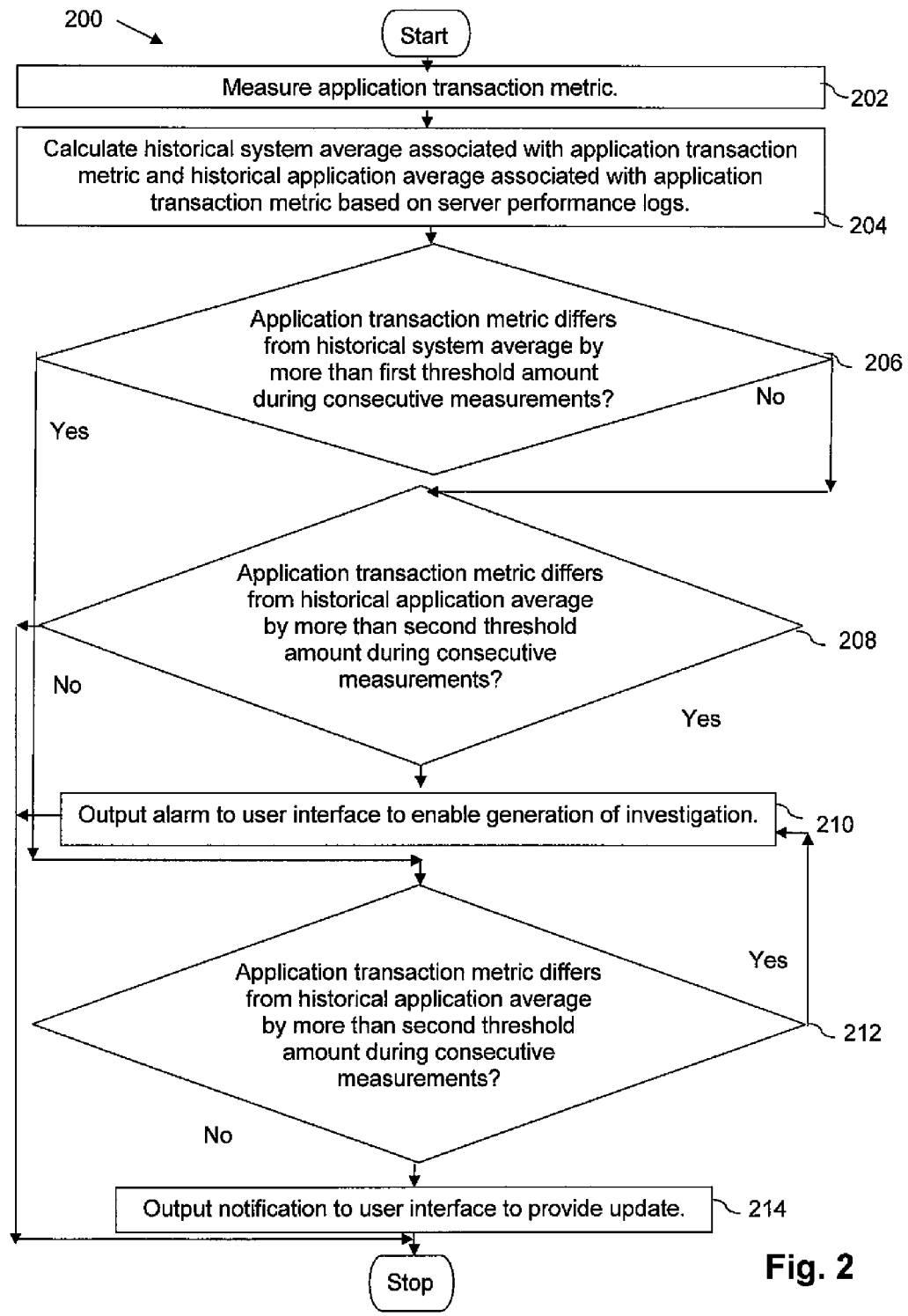
FIG. 2 depicts a flowchart for a method of application transaction analysis according to some embodiments of the present disclosure.

FIG. 2 shows a flowchart of a method 200 for application transaction analysis according to some embodiments of the present disclosure. The system 100 can execute the method 200 to output alarms and notifications based on analyzing application transactions.

In box 202, an application transaction metric is measured. For example, the analysis tool 138 measures an average response time of 500 milliseconds for the invoicing application 130.

In box 204, both a historical system average and a historical application average associated with an application transaction metric are calculated based on server performance logs. For example, the analysis tool 138 calculates a historical system average of 400 milliseconds for the first server 110 and a historical application average of 300 milliseconds for the invoicing application 130.

In box 206, a determination is made whether an application transaction metric differs from historical system average by more than a first threshold amount during consecutive measurements. For example, the analysis tool 138 determines whether the average response time of 500 milliseconds for the invoicing application 130 differs from the historical system average of 400 milliseconds for the first server 110 by more than the standard deviation of 120 milliseconds during consecutive measurements. If the application transaction metric does not differ from the historical system average by more than the system threshold amount during consecutive measurements, the method 200 continues to box 208. If the application transaction metric differs from the historical system average by more than the system threshold amount during consecutive measurements, the method 200 proceeds to box 212.

In box 208, a determination is made whether an application transaction metric differs from a historical application average by more than a second threshold amount during consecutive measurements. For example, the analysis tool 138 determines whether the average response time of 500 milliseconds for the invoicing application 130 differs from the historical application average of 300 milliseconds for the invoicing application 130 by more than the standard deviation of 90 milliseconds during consecutive measurements. If the application transaction metric differs from the historical application average by more than the application threshold amount during consecutive measurements, the method 200 continues to box 210. If the application transaction metric does not differ from the historical application average by more than the application threshold amount during consecutive measurements, the method 200 terminates.

In box 210, an alarm is output to a user interface to enable generation of an investigation. For example, the analysis tool 138 outputs an alarm identifying the invoicing application 130 as a potential problem to the user interface 136, and the method 200 terminates.

In box 212, whether an application transaction metric differs from a historical application average by more than a second threshold amount during consecutive measurements is determined. For example, the analysis tool 138 determines whether an average response time of 500 milliseconds for the invoicing application 130 differs from the historical application average of 300 milliseconds for the invoicing application 130 by more than the standard deviation of 90 milliseconds during consecutive measurements. If the application transaction metric differs from the historical application average by more than the application threshold amount during consecutive measurements, the method 200 proceeds to box 210. If the application transaction metric does not differ from the historical application average by more than the application threshold amount during consecutive measurements, the method 200 continues to box 214.

In box 214, a notification is output to a user interface to provide an update. For example, the analysis tool 138 outputs a notification for the invoicing application 130 as a potential problem to the user interface 136, and the method terminates.

Figure 3:
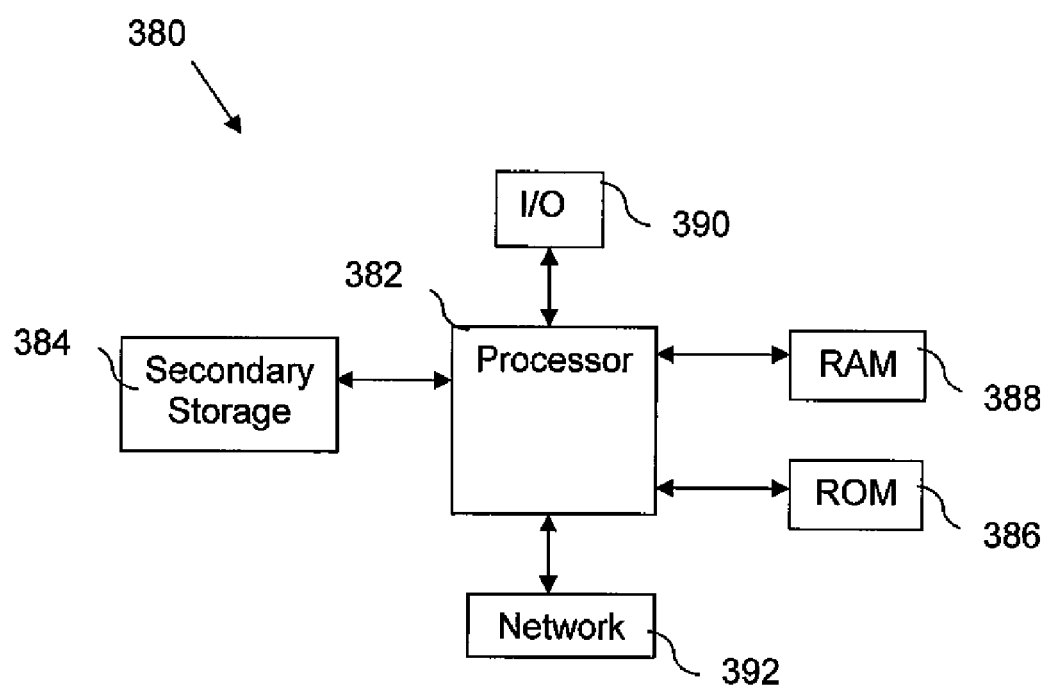
FIG. 3 illustrates an exemplary computer system suitable for implementing the several embodiments of the disclosure.

Some aspects of the system described above may be implemented on a computer with sufficient processing power, memory resources, and network throughput capability to handle the necessary workload placed upon it. FIG. 3 illustrates a typical computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382, for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example, optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer implemented system for network application transaction analysis, comprising:
    at least one processor;
    a user interface; and
    an analysis tool stored on a non-transitory computer readable medium and executable by the at least one processor to:
        measure an application transaction metric, calculate a historical system average associated with the application transaction metric and a historical application average associated with the application transaction metric based on server performance logs, determine whether the application transaction metric differs from the historical system average by more than a first threshold amount during a plurality of consecutive measurements, determine whether the application transaction metric differs from the historical application average by more than a second threshold amount during the plurality of consecutive measurements in response to a determination that the application transaction metric does not differ from the historical system average by more than the first threshold amount during the plurality of consecutive measurements, and output an alarm to the user interface to enable a generation of an investigation when the application transaction metric differs from the historical application average by more than the second threshold amount during the plurality of consecutive measurements.

2. The system of claim 1, wherein the application transaction metric is at least one of a response time for application transactions, a volume per time unit of the application transactions, and a transaction error rate.

3. The system of claim 2, wherein the transaction error rate comprises a number of at least one of data errors, faults, and timeouts.

4. The system of claim 2, wherein the historical system average associated with the volume of the application transactions is based on a system capacity.

5. The system of claim 1, wherein the application transaction metric and the historical application average are associated with one of an individual application and a category of applications.

6. The system of claim 1, wherein the first threshold amount is based on a standard deviation associated with the historical system average.

7. The system of claim 1, wherein the second threshold amount is based on a standard deviation associated with the historical application average.

8. The system of claim 1, wherein at least one of the first threshold and the second threshold is based on at least one of a service level objective and a service level agreement.

9. A computer implemented method for network application transaction analysis comprising:

measuring an application transaction metric;

calculating a historical system average associated with the application transaction metric and a historical application average associated with the application transaction metric based on server performance logs;

determining whether the application transaction metric differs from the historical system average by more than a first threshold amount during a plurality of consecutive measurements;

determining whether the application transaction metric differs from the historical application average by more than a second threshold amount during the plurality of consecutive measurements in response to a determination that the application transaction metric differs from the historical system average by more than the first threshold amount during the plurality of consecutive measurements;

outputting an alarm to a user interface to enable a generation of an investigation when the application transaction metric differs from the historical application average by more than the second threshold amount during the plurality of consecutive measurements; and outputting a notification to the user interface to provide an update that the application transaction metric differs from the historical system average by more than the first threshold amount when the application transaction metric does not differ from the historical application average by more than the second threshold amount for the plurality of consecutive measurements.

10. The computer implemented method of claim 9, wherein calculating at least one of the historical system average and the historical application average occurs on one of a daily schedule and a weekly schedule and is based on a filter that excludes outlier data associated with an identified event.

11. The computer implemented method of claim 9, wherein at least one of the historical system average and the historical application average is based on at least one of a time of day and a day of week.

12. The computer implemented method of claim 11, wherein the at least one of the time of day and the day of week is based on one of a previous four weeks and a previous thirteen months.

13. The computer implemented method of claim 9, wherein the alarm indicates an amount that the application transaction metric is more than the second threshold away from the historical application average.

14. The computer implemented method of claim 9, wherein the alarm is displayed on the user interface as a color associated with an amount that the application transaction metric is more than the second threshold away from the historical application average.

15. The computer implemented method of claim 9, wherein the notification indicates an amount that the application transaction metric is more than the first threshold away from the historical system average.

16. The computer implemented method of claim 9, wherein the notification is displayed on the user interface as a color associated with an amount that the application transaction metric is more than the first threshold away from the historical system average.

17. The computer implemented method of claim 9, wherein the notification includes a suggestion for a long term solution to address a situation when the application transaction metric is more than the first threshold away from the historical system average.

18. A system for network application transaction analysis comprising:

at least one processor;

a user interface; and an analysis tool stored on a non-transitory computer readable medium and executable by the at least one processor to:

measure a transaction success metric for application transactions and a volume of the application transactions, wherein the transaction success metric is defined as a transaction success amount divided by an amount of transaction attempts and the transaction success amount is defined as an amount of successful transactions that fail a service level objective subtracted from an amount of successful transactions, calculate a historical system average associated with the transaction success metric and a historical application average associated with the transaction success metric based on server performance logs, determine whether the transaction success metric differs from the historical system average by more than a first threshold amount based on the volume during a plurality of consecutive measurements, determine whether the transaction success metric differs from the historical application average by more than a second threshold amount based on the volume during the plurality of consecutive measurements in response to a determination that the transaction success metric differs from the historical system average by more than the first threshold amount based on the volume during the plurality of consecutive measurements, output an alarm to the user interface to enable an investigation when the transaction success metric differs from the historical application average by more than the second threshold amount based on the volume during the plurality of consecutive measurements, and output a notification to the user interface to provide an update when the transaction success metric does not differ from the historical application average by more than the second threshold amount based on the volume for the plurality of consecutive measurements.

19. The system of claim 18, wherein the analysis tool is further executable to:

determine whether the transaction success metric differs from the historical application average by more than the second threshold amount based on the volume during the plurality of consecutive measurements in response to a determination that the transaction success metric does not differ from the historical system average by more than the first threshold amount based on the volume during the plurality of consecutive measurements, and output the alarm to the user interface to enable the investigation in response to the determination that the transaction success metric differs from the historical application average by more than the second threshold amount based on the volume during the plurality of consecutive measurements.

20. The system of claim 18, wherein the amount of successful transactions is based on the amount of transaction attempts that is unassociated with one of a timeout and a failure to find.

* * * * *